United States Patent
Wang et al.

(10) Patent No.: US 11,568,220 B2
(45) Date of Patent: Jan. 31, 2023

(54) DEEP NEURAL NETWORK IMPLEMENTATION

(71) Applicant: INTERNATIONAL BUSINESS MACHINES CORPORATION, Armonk, NY (US)

(72) Inventors: Junsong Wang, Beijing (CN); Chao Zhu, Beijing (CN); Yonghua Lin, Beijing (CN); Yan GY Gong, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 906 days.

(21) Appl. No.: 16/045,033

(22) Filed: Jul. 25, 2018

(65) Prior Publication Data
US 2020/0034696 A1    Jan. 30, 2020

(51) Int. Cl.
*G06N 3/063* (2006.01)
*G06N 3/04* (2006.01)
*G06N 3/08* (2006.01)

(52) U.S. Cl.
CPC ............ *G06N 3/063* (2013.01); *G06N 3/04* (2013.01); *G06N 3/08* (2013.01)

(58) Field of Classification Search
CPC ............. G06N 3/063; G06N 3/04; G06N 3/08
See application file for complete search history.

(56) References Cited

FOREIGN PATENT DOCUMENTS

CN       106528357 A       3/2017

OTHER PUBLICATIONS

Li, H. et al, Pruning Filters for Efficient ConvNets, 2017 [retrieved Jan. 7, 2022]. Retrieved from Internet:<https://arxiv.org/abs/1608.08710> (Year: 2017).*

Sharma, H. et al, From High-Level Deep Neural Models to FPGAs, 2016 [retrieved May 17, 2021]. Retrieved from Internet:<https://ieeexplore.ieee.org/stamp/stamp.jsp?tp=&arnumber=7783720>, 12 pages (Year:2016) (Year: 2016).*

Wei, X. et al, Automated Systolic Array Architecture Synthesis for High Throughput CNN Inference on FPGAs, 2017 [retrieved May 7, 2021]. Retrieved from Internet: <https://dl.acm.org/doi/pdf/10.1145/3061639.3062207>, 6 pages (Year: 2017) (Year: 2017).*

Park, E., et al, Weighted-Entropy-based Quantization for Deep Neural Networks, [retrieved Mar. 11, 2022]. Retrieved from Internet:<https://openaccess.thecvf.com/content_cvpr_2017/html/Park_Weighted-Entropy-Based_Quantization_for_CVPR_2017_paper.html> (Year: 2017).*

(Continued)

*Primary Examiner* — Miranda M Huang
*Assistant Examiner* — Bart I Rylander
(74) *Attorney, Agent, or Firm* — Tutunjian & Bitetto, P.C.; Joseph Petrokaitis

(57) ABSTRACT

The present disclosure relates to methods, systems, and computer program products for implementing a deep neural network in a field-programmable gate array (FPGA). In response to receiving a network model describing a deep neural network, a plurality of layers associated with the deep neural network may be determined. With respect to a layer in the plurality of layers, a parallelism factor for processing operations associated with the layer simultaneously by processing elements in an FPGA may be determined based on a workload associated with the layer and a configuration of the FPGA.

20 Claims, 4 Drawing Sheets

(56) References Cited

OTHER PUBLICATIONS

Wang, Y. et al, DeepBurning: Automatic Generation of FPGA-based Learning Accelerators for the Neural Network Family, [retrieved Sep. 22, 2022]. Retrieved from Internet:<https://ieeexplore.ieee.org/abstract/document/7544251> (Year: 2016).*

Zhang, Chen, et al. "Caffeine: towards uniformed representation and acceleration for deep convolutional neural networks." Proceedings of the 35th International Conference on Computer-Aided Design, Nov. 2016, 8 pages.

Wang, Ying, et al. "DeepBurning: automatic generation of FPGA-based learning accelerators for the neural network family." Proceedings of the 53rd Annual Design Automation Conference. Jun. 2016, 7 pages.

Guan, Yijin, et al. "FP-DNN: An automated framework for mapping deep neural networks onto FPGAs with RTL-HLS hybrid templates." Field-Programmable Custom Computing Machines (FCCM), 2017 IEEE 25th Annual International Symposium on. IEEE, Apr. 2017, pp. 152-159.

Venieris, Stylianos I., et al. "fpgaConvNet: A framework for mapping convolutional neural networks on FPGAs." Field-Programmable Custom Computing Machines (FCCM), 2016 IEEE 24th Annual International Symposium on. IEEE, May 2016, pp. 40-47.

Sharma, Hardik, et al. "From high-level deep neural models to FPGAs." The 49th Annual IEEE/ACM International Symposium on Microarchitecture. IEEE Press, Oct. 2016, 12 pages.

Qiu, Jiantao, et al. "Going deeper with embedded fpga platform for convolutional neural network." Proceedings of the 2016 ACM/SIGDA International Symposium on Field-Programmable Gate Arrays. ACM, Feb. 2016, pp. 26-35.

Abdelouahab, Kamal, et al. "Hardware Automated Dataflow Deployment of CNNs." arXiv preprint arXiv:1705.04543, May 2017, 17 pages.

Zhang, Chen, et al. "Optimizing FPGA-based accelerator design for deep convolutional neural networks." Proceedings of the 2015 ACM/SIGDA International Symposium on Field-Programmable Gate Arrays. ACM, Feb. 2015, pp. 161-170.

Suda, Naveen, et al. "Throughput-optimized openCL-based FPGA accelerator for large-scale convolutional neural networks." Proceedings of the 2016 ACM/SIGDA International Symposium on Field-Programmable Gate Arrays. ACM, Feb. 2016, pp. 16-25.

* cited by examiner

DEEP NEURAL NETWORK IMPLEMENTATION

BACKGROUND

Technical Field

The present disclosure generally relates to a deep neural network (DNN). Specifically, the present disclosure relates to methods, systems and products for implementing a DNN in a field-programmable gate array (FPGA) environment.

Description of the Related Art

Nowadays, deep learning has led to great improvements in many artificial intelligence tasks, such as image classification, image recognition, speech recognition and natural language processing. Usually, a deep learning system such as DNN involves a complex and multi-layered neural network, which may require intensive computation workload. Besides general-purpose processing elements, FPGA(s) may be used to implement the DNN due to its inherent pipeline feature and better performance. However, an FPGA usually has a limited amount of resources such as memory, processing elements, and bandwidth. The above limitations make it very challenging to implement the DNN in an FPGA efficiently. At this point, how to increase the performance of DNN in FPGA with limited resources becomes a focus.

SUMMARY

In one aspect, a computer-implemented method is disclosed. According to the method, in response to receiving a network model describing a deep neural network, a plurality of layers associated with the deep neural network may be determined. With respect to a layer in the plurality of layers, a parallelism factor for processing operations associated with the layer simultaneously by processing elements in a field-programmable gate array (FPGA) may be determined based on a workload associated with the layer and a configuration of the FPGA.

In another aspect, a computer system is disclosed. The computing system includes a computer processor coupled to a computer-readable memory unit, where the memory unit includes instructions that when executed by the computer processor implements a method. According to the method, in response to receiving a network model describing a deep neural network, a plurality of layers associated with the deep neural network may be determined. With respect to a layer in the plurality of layers, a parallelism factor for processing operations associated with the layer simultaneously by processing elements in a field-programmable gate array (FPGA) may be determined based on a workload associated with the layer and a configuration of the FPGA.

In another aspect, a computer program product is disclosed. The computer program product includes a computer readable storage medium having program instructions embodied therewith. The program instructions are executable by an electronic device to cause the electronic device to perform actions of: in response to receiving a network model describing a deep neural network, determining a plurality of layers associated with the deep neural network; with respect to a layer in the plurality of layers, determining a parallelism factor for processing operations associated with the layer simultaneously by processing elements in a field-programmable gate array (FPGA) based on a workload associated with the layer and a configuration of the FPGA.

It is to be understood that the summary is not intended to identify key or essential features of implementations of the present disclosure, nor is it intended to be used to limit the scope of the present disclosure. Other features of the present disclosure will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

Throughout the drawings, same or similar reference numerals represent the same or similar elements.

DETAILED DESCRIPTION

Some preferable embodiments will be described in more detail with reference to the accompanying drawings, in which the preferable embodiments of the present disclosure have been illustrated. However, the present disclosure can be implemented in various ways, and thus should not be construed to be limited to the embodiments disclosed herein.

Figure 1:
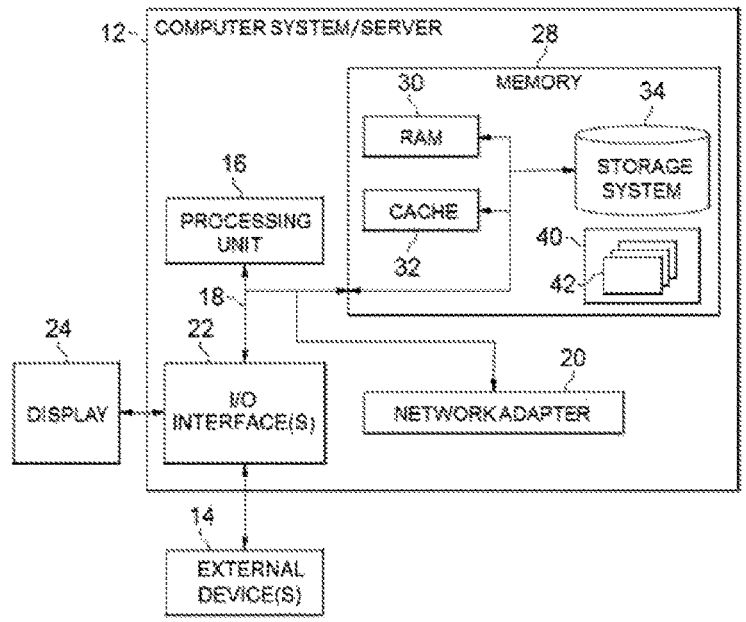
FIG. 1 illustrates an example computer system in accordance with embodiments of the present disclosure.

Referring now to FIG. 1, in which an exemplary computer system/server 12 configured to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing elements 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer-readable media. Such media may be any available media that is accessible by computer system/server 12, and it includes both volatile and non-volatile media, removable and non-removable media.

System memory 28 can include computer-readable media in the form of volatile memory, such as random access memory (RAM) 30 and/or cache memory 32. Computer system/server 12 may further include other removable/non-removable, volatile/non-volatile computer-readable storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Additionally, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing elements, external disk drive arrays, RAID systems, tape drives, and data archival storage systems, etc.

Figure 2:
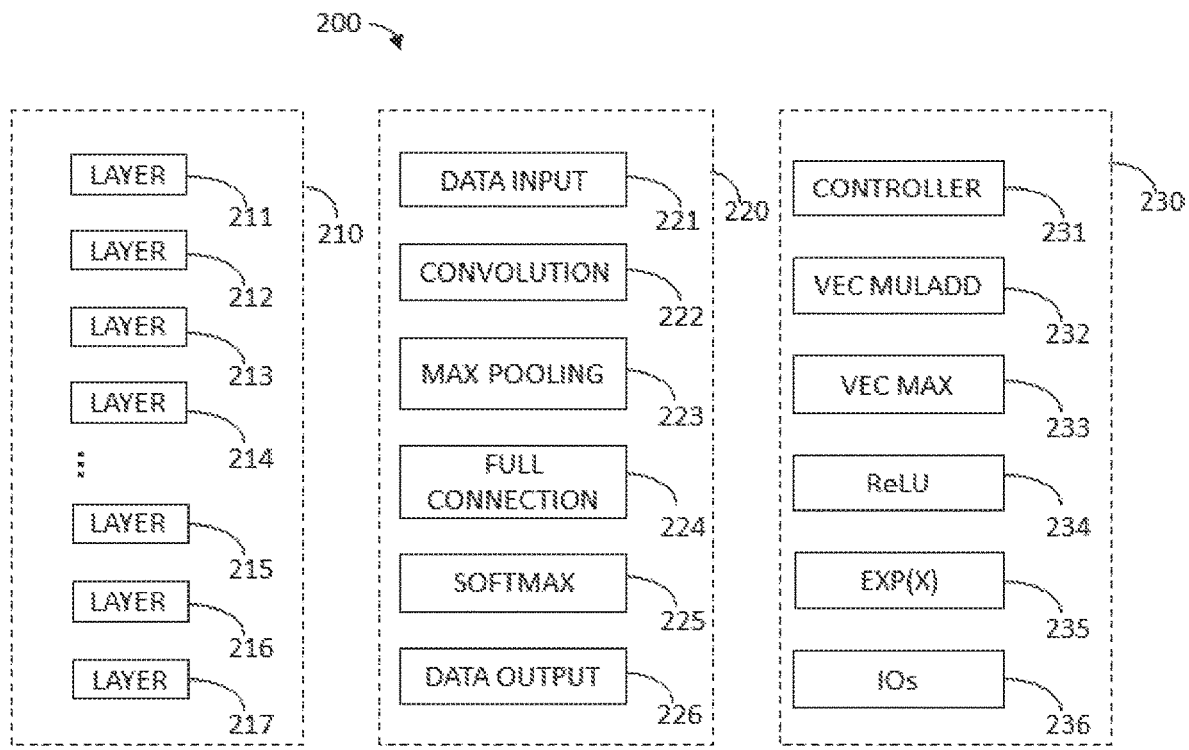
FIG. 2 illustrates an environment for implementing a DNN in an FPGA in accordance with an embodiment of the present disclosure.

For the sake of description, an environment for implementing a DNN in an FPGA will be described first. FIG. 2 illustrates an environment 200 for implementing a DNN in an FPGA. Referring to FIG. 2, a network model 210 describing a DNN may be obtained and then a plurality of net layers 211 to 217 associated with the DNN may be determined from the network model 210. Each of the net layers 211 to 217 may correspond to at least one of layers 221 to 226 in neural layers 220. Depending on the definition of the network model 210, the number of the net layers 211 to 217 and the number of the layers 221 to 226 may vary.

In one implementation, the neural layers 220 may include a data input layer 221, a convolution layer 222, a max pooling layer 223, a full connection layer 224, a soft max layer 225, and a data output layer 226, respectively. Operations associated with each of layers 221 to 226 may be decomposed to one or more basic linear algebra operations 230 such as a controller 231, a vector multiplication and adder 232, a vector max 233, a rectified linear unit (ReLu) 234, an Exp(x) 235, input/output (I/O) 236, and so on. The vector max 233 may select a maximal element in vector data. The ReLu 234 may output a value equal to an input data value if the input data value is greater than 0, otherwise it may output "0." The Exp(x) 235 may provide an exponential function output to an input data value.

Compared to CPU and GPU-based designs, FPGA is a promising candidate for DNN implementation because FPGA devices can be fully customized to implement the functionality of the DNN with decreased latency and improved energy consumption. Usually, the FPGA may include a large number of processing elements and these processing elements may be configured to processing operations simultaneously. Accordingly, at least a portion of the operations associated with the layers 221 to 226 may be processed simultaneously. There have been provided some approaches for processing operations associated with the DNN in an FPGA environment so as to accelerate the DNN. Although these approaches may process the operations simultaneously to a certain extent, processing elements in the FPGA are not utilized sufficiently.

Figure 3:
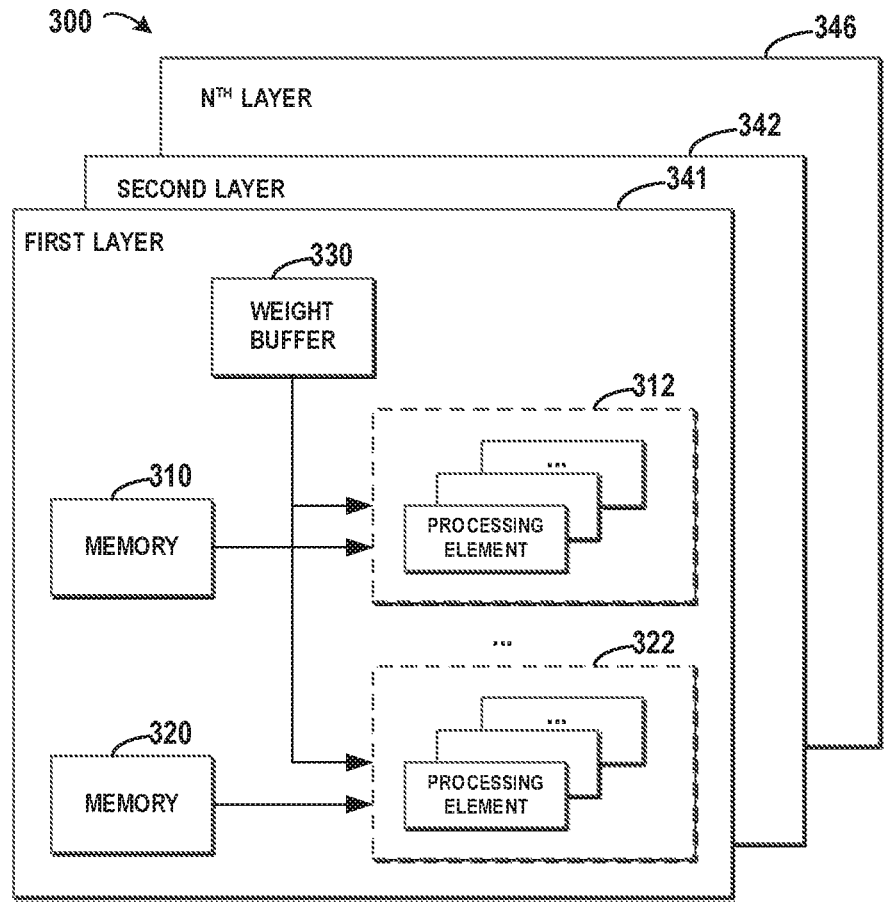
FIG. 3 illustrates an example diagram for implementing a DNN in an FPGA in accordance with an embodiment of the present disclosure.

In order to at least partially solve the above and other potential problems, a new method for implementing a DNN is disclosed according to embodiments of the present disclosure. Hereinafter, reference will be made to FIG. 3 to describe a general description of the present disclosure. FIG. 3 illustrates an example diagram 300 for implementing a DNN in an FPGA accordance with an embodiment of the present disclosure. In accordance with an embodiment of the present disclosure, there is provided a computer-implemented method. In the method, a network model describing a deep neural network may be received, and a plurality of layers associated with the deep neural network may be determined from the network model. Referring to FIG. 3, the first layer 341, the second layer 342, . . . , and the nth layer 346 may be determined from the network model. In one implementation, the layers 341, 342, . . . , 346 may correspond to the layers 221, 222, . . . and 226 in FIG. 2. In another embodiment, the amount of layers 341, 342, . . . , 346 may be different from that of the layers 221, 222, . . . and 226 in FIG. 2.

A parallelism factor (PF) is provided in the present disclosure, where the parallelism factor may indicate a level for processing operations associated with a layer in the plurality of layers 341, 342, . . . , 346. Referring to the first layer 341, a group 312 of processing elements may be used to process a first portion of operations associated with the first layer 341. Simultaneously, a group 322 of processing elements may be used to process a second portion of operations associated with the first layer 341. While processing these operations, weights and feature maps related to the first portion may be inputted from a weight buffer 330 and a memory 310 into the first group 312 of processing elements, respectively. Meanwhile, weights and feature maps related to the second portion may be inputted from a weight buffer 330 and a memory 320 into the second group 322 of processing elements, respectively. Based on the above description, operations associated with the first layer 341 may be processed in parallel.

In order to determine the parallelism factor of the operations, a total bandwidth required for processing operations associated with the plurality of layers in the FPGA may be determined. With respect to a layer in the plurality of layers, an amount of operations associated with the layer may be determined. Then, the parallelism factor for the layer may be determined based on the total bandwidth, the amount of operations associated with the layer, and a bandwidth of a memory in the FPGA. In the present embodiment, the parallelism factor may indicate a parallelism degree in processing the operations. Based on the parallelism factor, operations that are to be processed simultaneously may be determined.

Although the above paragraphs describe only the operations for one layer, in another implementation, the operations associated with different layers 341, 342, . . . , 346 may be processed simultaneously. Accordingly, the performance of the DNN may be increased.

Figure 4:
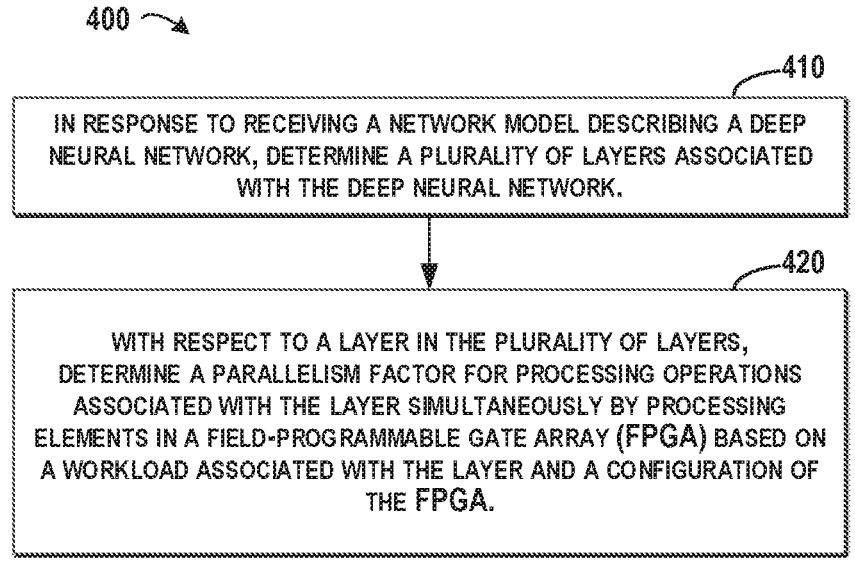
FIG. 4 illustrates an example flowchart of a method for implementing a DNN in an FPGA in accordance with an embodiment of the present disclosure.

FIG. 4 illustrates an example flowchart of a method 400 for implementing a DNN in an FPGA in accordance with an embodiment of the present disclosure. In FIG. 4, at a block 410, in response to receiving a network model describing a deep neural network, a plurality of layers associated with the deep neural network may be determined. The network model may be a DNN net file. The DNN net file may be analyzed to obtain the plurality of layers according to definitions in the net file.

At block 420, with respect to a layer in the plurality of layers, a parallelism factor for processing operations associated with the layer simultaneously by processing elements in FPGA may be determined based on a workload associated with the layer and a configuration of the FPGA. The parallelism factor may depend on the workload of the layer, the heavier the workload, the more the processing elements. On the other hand, the parallelism factor may also depend on tile configuration of the FPGA. If the configuration is high and may provide enough processing elements, the parallelism factor may be high.

In according to one implementation of the present disclosure, the workload associated with the layer may include an amount of operations associated with the layer, and the configuration of the FPGA may include a total bandwidth required for processing operations associated with the plurality of layers in the FPGA and a bandwidth of a memory in the FPGA. It shall be understood that the workload associated with the layer and the configuration of the FPGA may further include other parameters instead of or in addition to one or more parameters provided by embodiments of the disclosure, or may be determined according to other parameters and/or one or more parameters provided by embodiments of the disclosure.

In the FPGA, in order to process the operations, various types of data such as the weights and feature map should be loaded into the FPGA, and thus the total bandwidth may be determined based on the data that is to be loaded. With respect to a layer in the plurality of layers, an amount of operations associated with the layer may be determined. The amount of operations for each of these layers may be determined from the network model. Thus, the parallelism factor may be determined based on the total bandwidth, the amount of operations associated with the layer, and a bandwidth of a memory in the FPGA. Details about formulas for determining the parallelism factor will be described hereinafter.

In accordance with an embodiment of the present disclosure, the parallelism factor for the layer may include two aspects: a channel parallelization factor (CPF) indicating an amount of channels that are to be processed simultaneously in the layer; and a kernel parallelization factor (KPF) indicating an amount of kernels that are to be processed simultaneously in the layer. Therefore, the CPF and KPF may provide a guideline for how to allocate the resources in the FPGA for processing operations for each layer.

In the present embodiment, a workload (e.g., amount of data) of each layers 221 to 226 may be determined (or estimated) to determine a parallelism factor with respect to kernels or channels under the constraints of the FPGA resources. Here, the greater the parallelism factor (e.g., KPF and CPF), the faster the DNN implemented in the FPGA. However, a higher parallelism factor requires more FPGA resources (e.g., processing elements, memory, bandwidth, etc.), therefore the present embodiment may adjust the KPF and CPF based on available resources in the FPGA. Typically, the FPGA resources may depend on FPGA types, an optimal KPF and CPF may be determined according to the workload of each layer under the constraints of the FPGA resources, thus allowing full use of the limited resources.

In accordance with an embodiment of the present disclosure, the parallelism factor may be determined based on the following Formula 1:

$$PF_i > \frac{Nops_i \times ABW}{NTBW} \quad \text{Formula 1}$$

In Formula 1, the parallelism factor for a layer i in the plurality of layers is represented by an indicator $PF_i$, the amount of operations associated with the layer i is represented by an indicator $Nops_i$, the bandwidth of the memory in the FPGA is represented by an indicator ABW, and the total bandwidth is represented by an indicator NTBW. In the present embodiment, the parallelism factor $PF_i$ may be determined based on values of the amount of operations associated with the layer i, the bandwidth of the memory, and the total bandwidth required for all of the plurality of layers.

It is to be understood that the amount of various resources in the FPGA may be powers of 2. Therefore, in order to ensure that the FPGA's implementation is efficient, an integer being a power of 2 and satisfying the above Formula 1 may be selected as the parallelism factor. In accordance with an embodiment of the present disclosure, the parallelism factor $PF_1$ is determined based on the following Formula 2 to ensure that it is a power of 2:

$$PF_i = 2^{\left\lceil \frac{Nops_i \times ABW}{NTBW} \right\rceil} \quad \text{Formula 2}$$

In Formula 2, ⌈ ⌉ represents a ceiling function. Due to the configuration of the FPGA, the amount of operations that may be processed simultaneously may be a power of 2. Therefore, the above Formula 2 may ensure that the determined $PF_i$ is a power of 2 and also meets the above Formula 1. In the present embodiment, a minimum integer which meets the power of 2 and the above Formula 1 may be determined based on Formula 2.

In accordance with an embodiment of the present disclosure, a total bandwidth may be determined based on the following Formula 3:

$$NTBW = clock\_freq \times \Sigma_1^N Nops_i \times BPO_i \qquad \text{Formula 3}$$

In the above Formula 3, a frequency of the FPGA is represented by an indicator clock_freq, an amount of operations for the layer i is represented by an indicator $Nops_i$, an amount of bits to be loaded into the FPGA for one operation for the layer i is represented by an indicator $BPO_i$, and an amount of the plurality of layers is represented by an indicator N. In the present embodiment, based on the amount of bits to be loaded into the FPGA for the layer I and the frequency of the FPGA, the total bandwidth may be estimated in a more accurate manner.

Hereinafter, details about how to determine the amount of bits for one operation associated with the layer i will be described. Two types of data such as the weights and the feature map may be loaded into the FPGA, where the weights are parameters associated with the layer I for training the DNN, in accordance with an embodiment of the present disclosure, the amount of bits $BPO_i$ may be determined based on the following Formula 4:

$$BPO_i = DW_i/(H_i \times R_i), \qquad \text{Formula 4}$$

Figure 5:
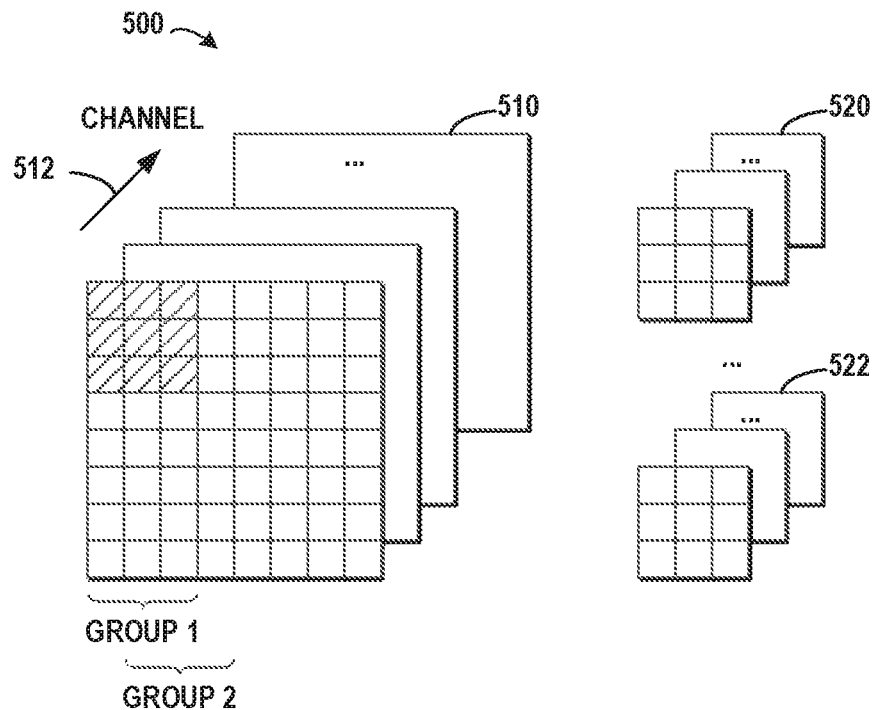
FIG. 5 illustrates an example diagram for processing operations associated with one layer in a plurality of layers of the DNN in accordance with an embodiment of the present disclosure.

In the above Formula 4, a width of weights associated with the layer i is represented by an indicator $DW_i$, a height of an output feature map for the layer i is represented by an indicator $H_i$, and a reuse factor for the layer i is represented by an indicator $R_i$, where the reuse factor $R_i$ indicates how many columns in an input feature map is reused for the layer i during processing operations associated with the layer i. Reference will be made to FIG. 5 for details about the Formula 4.

FIG. 5 illustrates an example diagram 500 for processing operations associated with one layer in a plurality of layers of the DNN in accordance with an embodiment of the present disclosure. In FIG. 5, a reference number 510 indicates the feature map for the layer i, and reference numbers 520, . . . , 522 indicate the weights data. Here, the weights data may be stored in units of kernels. For example, the reference number 520 indicates one kernel and the reference number 522 indicates another kernel. Depending on a definition of the DNN, the number of the kernels for the layer i may vary. According to FIG. 5, the feature map 510 may be in three dimensions and the depth dimension, as shown by an arrow 512, may indicate channels in the feature map 510.

During loading the feature map 510, groups of columns with different widths in the feature map 510 may be loaded into the FPGA. As shown in FIG. 5, the groups 1 and 2 may have the width of 3, which is equal to the width of the kernel. In another implementation, groups having the width of 4 columns may be loaded. At this point, the width of the loaded columns may be greater than the width of the kernel by 1, and thus one column in the feature map 510 may be reused during processing operations associated with the layer i. In this implementation, the indicator $R_i$ may be set to 1 for the layer i. In another implementation, if a group of 5 columns are loaded, the indicator $R_i$ may be set to 5−3=2. Further, a height of the feature map 510 for the layer i is represented by an indicator $H_i$. If the dimensions of the feature map 510 are 224×224×128, then the indicator $H_i$ may be set to 224. The indicator $DW_i$ may represent a width of weights associated with the layer i. If the weights are stored in 8 bits, then indicator $DW_i$ may be set to 8.

The above paragraphs having described how to determine the value of the parallelism factor $PF_i$, the following paragraphs will introduce how to determine the two aspects ($CPF_i$ and $KPF_i$) of the parallelism factor $PF_i$. In accordance with an embodiment of the present disclosure, the $CPF_i$ and the $KPF_i$ for the layer i are determined based on the following Formula 5:

$$CPF_i \times KPF_i = PF_i \qquad \text{Formula 5}$$

It is to be understood that both of $CPF_i$ and $KPF_i$ may be integers and the product of $CPF_i$ and $KPF_i$ may satisfy the above Formula 5. Once the value of $PF_i$ is determined, there may be a limited number of combinations of $CPF_i$ and $KPF_i$.

The measurement unit in the FPGA may be a power of 2, and then each of the $CPF_i$ and the $KPF_i$ may be a power of 2. In one example, if $PF_i$ is determined to be 16, then the values of $CPF_i$ and $KPF_i$ may have the following combinations: (2, 8), (4, 4), and (8, 2). Therefore, the values of $CPF_i$ and $KPF_i$ may be selected from the above three combinations.

Based on historical experience, $CPF_i$ and $KPF_i$ that have the same or close values may result in a high performance of the DNN, and thus $CPF_i$ and $KPF_i$ meeting the above rule may be selected in accordance with an embodiment of the present disclosure. Continuing the above example, the combination (4, 4) may be selected. In another example, if $PF_i$ is determined to be 32, then the values of $CPF_i$ and $KPF_i$ may have the following combinations: (2, 16), (4, 8), (8, 4) and (16, 2). Further, based on the above rule, the combinations (4, 8) or (8, 4) may be selected.

It is to be understood that the above paragraphs describe an ideal situation where the parallelism processing may be maximized based on the workload for the layer i. However, depending on the type of FPGA, sometimes there are not enough resources for supporting the parallelism processing in the ideal situation. In accordance with an embodiment of the present disclosure, the processing ability of resources in the FPGA may be determined. If the resources in the FPGA are not enough for processing operations associated with the layer i, the $CPF_i$ and the $KPF_i$ for the layer i may be determined based on $CPF_i \times KPF_i = PF_i/2$. Supposing $PF_i$ is determined to be 32 and the resources in the FPGA are not enough for supporting the determined $CPF_i$ and $KPF_i$, then the parallelism factor $PF_i$ may be determined as $$PF_i = \frac{PF_i}{2} = \frac{32}{2} = 16.$$

Figure 6:
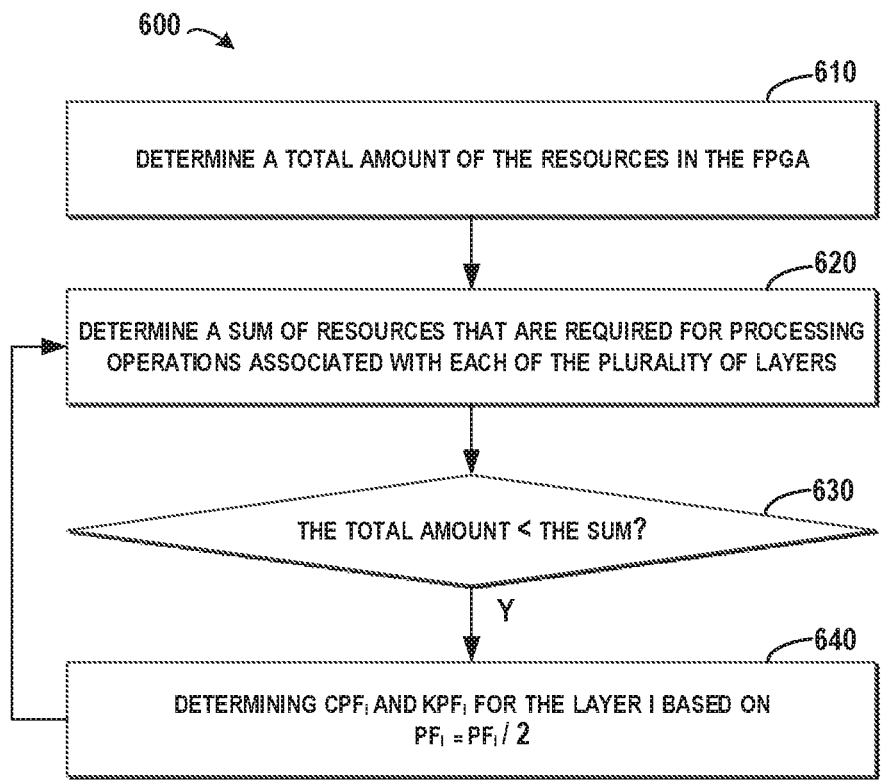
FIG. 6 illustrates an example flowchart of a method for determining a channel parallelization factor and a kernel parallelization factor for one layer in accordance with an embodiment of the present disclosure.

Then, based on the new parallelism factor $PF_i$, the $CPF_i$ and $KPF_i$ may have new values such as (4, 4). Reference will be made to FIG. 6 for the details of the above iteration processing.

FIG. 6 illustrates an example flowchart of a method 600 for determining a channel parallelization factor and a kernel parallelization factor for one layer in accordance with an embodiment of the present disclosure. At a block 610, as illustrated in FIG. 6, the total amount of resources in the FPGA may be determined. The resources may include any of processing resources and memory resources. In block 610, the amounts of the processing resources (such as the number of processing elements in the FPGA) and memory resources (such as the number of memories in the FPGA) may be determined as TDSP and TBRAM respectively. Both of TDSP and TBRAM are dependent on the type of FPGA and may be obtained in the user manual of the FPGA.

At a block 620 in FIG. 6, a sum of resources that are required for processing operations associated with each of the plurality of layers may be determined. The sum may be determined based on the resources that are required for processing operations associated with the layer i. For example, the amount of processing resources for the layer i may be represented as $NDSP_i$, where $NDSP_i$ may equal $PF_i$. For some low precision operations having operands of 8 bits, $NDSP_i = PF_i/2$. In another example, the amount of memory resources for the layer i may be represented as $NBRAM_i$, and it may be determined based on the amounts of reshape memory, weights memory and bias memory. In an embodiment of the present disclosure, the $NDSP_i$ and $NBRAM_i$ may be determined based on the following formulas:

$$NDSP = \sum_{i=1}^{N} NDSP_i \quad \text{Formula 6}$$

$$NBRAM = \sum_{i=1}^{N} NBRAM_i \quad \text{Formula 7}$$

In the present embodiment, if the total amount is lower than the sum in block 630, then it may be determined that the resources are not enough for processing operations associated with layer i. It is to be understood that the resources include both the processing resources and the memory resources. If any of the resources are not enough, the value of the parallelism factor $PF_i$ may be recalculated based on $PF_i = PF_i/2$ in block 640. Accordingly, whether the resources are enough in block 630 may be determined based on the following formula:

$$SIZE = \min\left(\left\lfloor \frac{TDSP}{\sum_{i=1}^{N} NDSP_i} \right\rfloor, \left\lfloor \frac{TBRAM}{\sum_{i=1}^{N} NBRAM_i} \right\rfloor\right) \quad \text{Formula 8}$$

In the Formula 8, "min(x, y)" may represent a function to determine a minimum from x and y; and $\lfloor \ \rfloor$ may represent a ground operation. According to Formula 8, if the determined SIZE equals 0, then the resources are not enough for supplying the current $PF_i$, and the $PF_i$ may be set according to $PF_i = PF_i/2$. In one example, if $$\left\lfloor \frac{TDSP}{\sum_{i=1}^{N} NDSP_i} \right\rfloor = 0 \text{ and } \left\lfloor \frac{TBRAM}{\sum_{i=1}^{N} NBRAM_i} \right\rfloor = 1,$$

then the processing resources are not enough. Although the memory resources may support the parallelism factor $PF_i$, the parallelism factor $PF_i$ may be recalculated based on $PF_i = PF_i/2$. In another example, if $$\left\lfloor \frac{TDSP}{\sum_{i=1}^{N} NDSP_i} \right\rfloor = 1 \text{ and } \left\lfloor \frac{TBRAM}{\sum_{i=1}^{N} NBRAM_i} \right\rfloor = 1$$

in block 630, it may indicate that both of the memory resources may support the parallelism factor $PF_i$.

In accordance with an embodiment of the present disclosure, operations for different layers in the DNN may be processed according to a pipeline mode. Specifically, a portion of operations associated with a first layer may be processed simultaneously with a portion of operations associated with a second layer that follows the first layer. In other words, operations associated with the first and second layers may be processed simultaneously in the FPGA. In the FPGA, a portion of an input feature map for the first layer may be processed to obtain an output feature map, where the output feature map may be an input feature map for the second layer. Next, a further portion of the input feature map for the first map and the input feature map for the second layer may be processed simultaneously in the FPGA. In the present embodiment, operations for the plurality of layers may be processed in a pipeline in the FPGA to increase the performance of the DNN.

Figure 7:
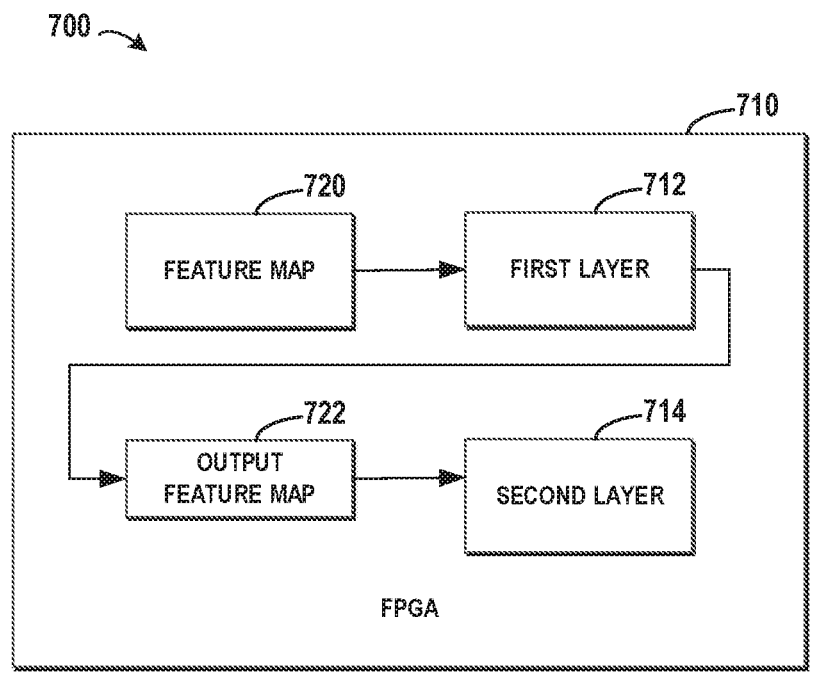
FIG. 7 illustrates an example diagram for processing operations associated with two layers in a pipeline mode in accordance with an embodiment of the present disclosure.

FIG. 7 illustrates an example diagram 700 for processing operations associated with two layers in a pipeline mode in accordance with an embodiment of the present disclosure. As illustrated in FIG. 7, a first layer 712 and a second layer 714 of the DNN are implemented in an FPGA 710. The feature map 720 is first loaded into the FPGA 710 for processing operations associated with the first layer 712. After period of time, a portion of the feature map 720 is processed and the output feature map 722 is generated from the first layer 712. At this point, the output feature map 722 may serve as input data and may be processed in the second layer 714 when another portion of the feature map 720 is processed in the first layer 712. Based on the above pipe line mode, operations associated with different layers in the DNN may be processed simultaneously. Therefore, the parallelism level of resources in the FPGA may be increased, and thus the DNN may be accelerated.

Figure 8:
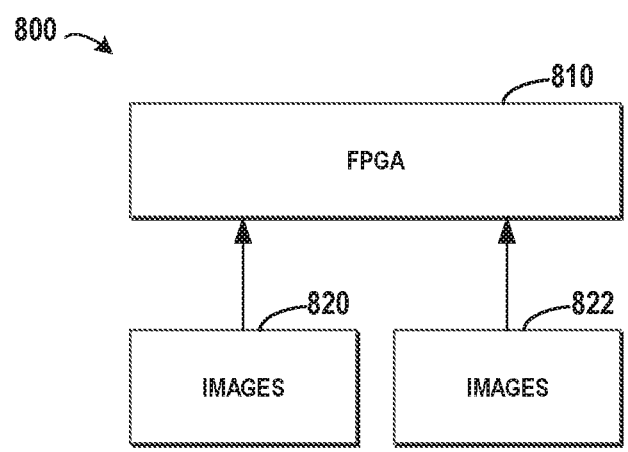
FIG. 8 illustrates an example diagram for processing operations associated with two signal channels simultaneously in accordance with an embodiment of the present disclosure.

In one implementation of the present disclosure, if the FPGA has plenty of resources, the FPGA may be configured to process input data associated with multiple signal channels. For example, in a monitoring system including two cameras, images captured by the two cameras may be processed in the FPGA. FIG. 8 illustrates an example diagram 800 for processing operations associated with two signal channels simultaneously in accordance with an embodiment of the present disclosure. As illustrated in FIG. 8, a DNN for processing images may be implemented in an FPGA 810. Due to the amount of resources in the FGPA 810, images that are collected from two cameras may be processed by the FPGA 810. For example, images 820 and 822 may be inputted from a first and a second camera into the FPGA 810, and then processed in the FPGA 810.

Although FIG. 8 illustrates a situation where two signal channels, images 820 and 822, are inputted into the FPGA 810, in another embodiment, more than two channels of images may be processed by the FPGA 810. In the present embodiment, resources in the FPGA may be utilized simultaneously so as to increase the performance of the FPGA 810.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein includes an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for improving deep neural network performance in a field-programmable gate array, the method comprising:
   in response to receiving a network model describing a deep neural network, determining a plurality of layers associated with the deep neural network;
   with respect to a layer in the plurality of layers, determining a parallelism factor for processing operations associated with the layer simultaneously by processing elements in a field-programmable gate array (FPGA) based on a workload associated with the layer and a configuration of the FPGA, including a relationship between an amount of operations associated with the layer, a bandwidth of a memory in the FPGA, and a total bandwidth needed for the processing operations;

determining an amount of bits for one operation associated with the layer, wherein the determining an amount of bits is based on weight and feature map data to be loaded into the FPGA, the weights being parameters associated with the layer for training the DNN; and with respect to a second layer in the plurality of layers that follows the layer, processing in the FPGA a portion of an input feature map for the layer to obtain an output feature map, the output feature map being an input feature map for the second layer.

2. The computer-implemented method of claim 1, wherein:
the workload associated with the layer comprises the amount of operations associated with the layer; and
the configuration of the FPGA comprises the total bandwidth needed for the processing operations associated with the plurality of layers in the FPGA and the bandwidth of the memory in the FPGA.

3. The computer-implemented method of claim 2, wherein determining the parallelism factor is based on $$PF_i > \frac{Nops_i \times ABW}{NTBW},$$

wherein:
the parallelism factor for a layer i in the plurality of layers is represented by an indicator $PF_i$,
an amount of operations associated with the layer i is represented by an indicator $Nops_i$,
the bandwidth of the memory in the FPGA is represented by an indicator ABW, and
the total bandwidth is represented by an indicator NTBW.

4. The computer-implemented method of claim 3, further comprising:
determining the parallelism factor $PF_i$ based on $$PF_i = 2^{\left\lceil \frac{Nops_i \times ABW}{NTBW} \right\rceil},$$

wherein ⌈ ⌉ represents a ceiling function.

5. The computer-implemented method of claim 3, further comprising:
determining the total bandwidth based on $NTBW = clock\_freq \times \Sigma_1^N Nops_i \times BPO_i$, wherein:
a frequency of the FPGA is represented by an indicator clock_freq,
an amount of bits to be loaded into the FPGA for one operation for the layer i is represented by an indicator $BPO_i$, and
an amount of the plurality of layers is represented by an indicator N.

6. The computer-implemented method of claim 5, further comprising:
determining the amount of bits $BPO_i$ based on $BPO_i = DW_i/(H_i \times R_i)$, wherein:
a width of weights associated with the layer i is represented by an indicator $DW_i$, a height of an output feature map for the layer i is represented by an indicator $H_i$, and
a reuse factor for the layer i is represented by an indicator $R_i$, the reuse factor $R_i$ indicating an amount of columns in an input feature map for the layer i being reused during processing operations associated with the layer i.

7. The computer-implemented method of claim 3, wherein determining the parallelism factor for the layer comprises: determining a channel parallelization factor (CPF) and a kernel parallelization factor (KPF) for the layer,
wherein the CPI indicates an amount of channels that are to be processed simultaneously in the layer, and
wherein the KPF indicates an amount of kernels that are to be processed simultaneously in the layer.

8. The computer-implemented method of claim 7, wherein the $CPF_i$ and the $KPF_i$ for the layer i are determined based on $CPF_i \times KPF_i = PF_i$, each of the $CPF_i$ and the $KPF_i$ is a power of 2.

9. The computer-implemented method of claim 8, further comprising:
in response to resources in the FPGA not being enough for processing operations associated with the layer i, determining the $CPF_i$ and the $KPF_i$ for the layer i based on $CPF_i \times KPF_i = PF_i/2$.

10. The computer-implemented method of claim 9, further comprising determining resources in the FPGA not being enough for processing operations associated with the layer i in response to:
a total amount of the resources in the FGPA being below a sum of resources that are required for processing operations associated with each of the plurality of layers,
wherein the resources comprise at least one of processing resources and memory resources.

11. The computer-implemented method of claim 1, further comprising:
with respect to a first layer in the plurality of layers and a second layer that follows the first layer:
processing, simultaneously in the FPGA, a further portion of the input feature map for the first layer and the input feature map for the second layer.

12. A computer system, comprising a computer processor coupled to a computer-readable memory unit, the memory unit comprising instructions that when executed by the computer processor implements a method for improving deep neural network performance in a field-programmable gate array, the method comprising:
in response to receiving a network model describing a deep neural network, determining a plurality of layers associated with the deep neural network;
with respect to a layer in the plurality of layers, determining a parallelism factor for processing operations associated with the layer simultaneously by processing elements in a field-programmable gate array (FPGA) based on a workload associated with the layer and a configuration of the FPGA, including a relationship between an amount of operations associated with the layer, a bandwidth of a memory in the FPGA, and a total bandwidth needed for the processing operations;
determining an amount of bits for one operation associated with the layer, wherein the determining an amount of bits is based on weight and feature map data to be loaded into the FPGA, the weights being parameters associated with the layer for training the DNN; and
with respect to a second layer in the plurality of layers that follows the layer, processing in the FPGA a portion of an input feature map for the layer to obtain an output feature map, the output feature map being an input feature map for the second layer.

13. The computer system of claim 12, wherein:
the workload associated with the layer comprises the amount of operations associated with the layer; and
the configuration of the FPGA comprises the total bandwidth needed for the processing operations associated with the plurality of layers in the FPGA and the bandwidth of the memory in the FPGA.

14. The computer system of claim 13, wherein determining the parallelism factor is based on $$PF_i > \frac{Nops_i \times ABW}{NTBW},$$

wherein
the parallelism factor for a layer i in the plurality of layers is represented by an indicator $PFD_i$,
an amount of operations associated with the layer i is represented by an indicator $Nops_i$,
the bandwidth of the memory in the FPGA is represented by an indicator ABW, and
the total bandwidth is represented by an indicator NTBW.

15. The computer system of claim 14, further comprising: determining the parallelism factor $PF_i$ based on $$PF_i = 2^{\lceil \frac{Nops_i \times ABW}{NTBW} \rceil},$$

wherein ⌈ ⌉ represents a ceiling function.

16. The computer system of claim 14, further comprising: determining the total bandwidth based on $NTBW = clock\_freq \times \Sigma_1^N Nops_j \times BPO_j$, wherein
a frequency of the FPGA is represented by an indicator cloc_freq,
an amount of bits to be loaded into the FPGA for one operation for the layer i is represented by an indicator $BPO_i$, and
an amount of the plurality of layers is represented by an indicator N.

17. The computer met system of claim 16, further comprising: determining the amount of bits $BPO_i$ based on $BPO_i = DW_i/(H_i \times R_i)$, wherein:
a width of weights associated with the layer i is represented by an indicator $DW_i$,
a height of an output feature map for the layer i is represented by an indicator $H_i$, and
a reuse factor for the layer i is represented by an indicator $R_i$, the reuse factor $R_i$ indicating an amount of columns in an input feature map for the layer i being reused during processing operations associated with the layer i.

18. The computer system of claim 14, wherein determining the parallelism factor for the layer comprises: determining a channel parallelization factor (CH) and a kernel parallelization factor (KPF) for the layer,
wherein the CPF indicates an amount of channels that are to be processed simultaneously in the layer, and
wherein the KPF indicates an amount of kernels that are to be processed simultaneously in the layer.

19. The computer system of claim 18, wherein the $CPF_i$ and the $KPF_i$ for the layer i are determined based on $CPF_i \times KPF_i = PF_i$, each of the $CPF_i$ and the $KPF_i$ is a power of 2.

20. A computer program product, the computer program product comprising a computer-readable storage medium having program instructions embodied therewith, the program instructions executable by an electronic device to cause the electronic device to perform a method for improving deep neural network performance in a field-programmable gate array, the method comprising:
in response to receiving a network model describing a deep neural network, determining a plurality of layers associated with the deep neural network;
with respect to a layer in the plurality of layers, determining a parallelism factor for processing operations associated with the layer simultaneously by processing elements in a field-programmable gate array (FPGA) based on a workload associated with the layer and a configuration of the FPGA, including a relationship between an amount of operations associated with the layer, a bandwidth of a memory in the FPGA, and a total bandwidth needed for the processing operations;
determining an amount of bits for one operation associated with the layer, wherein the determining an amount of bits is based on weight and feature map data to be loaded into the FPGA, the weights being parameters associated with the layer for training the DNN; and
with respect to a second layer in the plurality of layers that follows the layer, processing in the FPGA a portion of an input feature map for the layer to obtain an output feature map, the output feature map being an input feature map for the second layer.

* * * * *